(12) United States Patent
Gaeta

(10) Patent No.: US 9,134,725 B2
(45) Date of Patent: Sep. 15, 2015

(54) METHOD OF CONFIGURING MANUFACTURING EXECUTION SYSTEMS

(75) Inventor: Giovanni Gaeta, Genoa (IT)

(73) Assignee: Siemens Aktiengesellschaft, Munich (DE)

(*) Notice: Subject to any disclaimer, the term of this patent is extended or adjusted under 35 U.S.C. 154(b) by 341 days.

(21) Appl. No.: 12/678,908

(22) PCT Filed: Sep. 15, 2008

(86) PCT No.: PCT/EP2008/007659
§ 371 (c)(1),
(2), (4) Date: Mar. 24, 2010

(87) PCT Pub. No.: WO2009/036940
PCT Pub. Date: Mar. 26, 2009

(65) Prior Publication Data
US 2010/0198382 A1  Aug. 5, 2010

(30) Foreign Application Priority Data
Sep. 21, 2007 (EP) ..................... 07018587

(51) Int. Cl.
G06F 19/00 (2011.01)
G05B 19/418 (2006.01)
G05B 19/042 (2006.01)
G05B 19/05 (2006.01)
G06F 17/22 (2006.01)

(52) U.S. Cl.
CPC ...... *G05B 19/41865* (2013.01); *G05B 19/0426* (2013.01); *G05B 19/056* (2013.01); *G06F 17/2247* (2013.01); *G05B 2219/31372* (2013.01)

(58) Field of Classification Search
CPC ................................. G05B 19/41865
USPC ........................................... 700/97
See application file for complete search history.

(56) References Cited

U.S. PATENT DOCUMENTS

| | | | |
|---|---|---|---|
| 7,231,398 B2 * | 6/2007 | Schlereth et al. | 1/1 |
| 7,443,282 B2 * | 10/2008 | Tu et al. | 340/10.1 |
| 7,500,017 B2 * | 3/2009 | Cseri et al. | 709/246 |
| 7,720,809 B2 * | 5/2010 | Knudsen et al. | 707/609 |

(Continued)

FOREIGN PATENT DOCUMENTS

| | | | |
|---|---|---|---|
| EP | 1657606 A2 | 5/2006 | |
| EP | 1736839 A2 | 12/2006 | |

(Continued)

OTHER PUBLICATIONS

XML-binary Optimized Packing, W3C Recommendation, Jan. 25, 2005, [Online]. Downloaded May 5, 2012. Retrieved from: http://www.w3.org/TR/2005/REC-xop10-20050125/.*

*Primary Examiner* — Mohammad Ali
*Assistant Examiner* — Ziaul Karim
(74) *Attorney, Agent, or Firm* — Laurence A. Greenberg; Werner H. Stemer; Ralph E. Locher

(57) ABSTRACT

In a method of configuring a manufacturing execution system implemented in industrial production systems, data of a first coding type is received from a first hierarchical layer, and data of a second coding type is received from a second hierarchical layer. The method transforms at least one of the data of the first type and the data of the second type to a complex data structure configured for implementing uniform data processing within the manufacturing execution system.

3 Claims, 3 Drawing Sheets

(56) References Cited

U.S. PATENT DOCUMENTS

| | | | |
|---|---|---|---|
| 7,809,679 B2* | 10/2010 | Nixon et al. | 707/609 |
| 8,037,129 B2* | 10/2011 | Schuierer | 709/203 |
| 8,069,071 B2* | 11/2011 | Kall et al. | 705/7.12 |
| 2005/0159932 A1 | 7/2005 | Thurner | |
| 2005/0267882 A1 | 12/2005 | Aupperlee et al. | |
| 2006/0074498 A1* | 4/2006 | Kalan et al. | 700/19 |
| 2006/0108411 A1 | 5/2006 | Macurek et al. | |
| 2007/0078537 A1 | 4/2007 | Chand et al. | |
| 2008/0028068 A1* | 1/2008 | Nochta et al. | 709/224 |
| 2008/0208919 A1* | 8/2008 | i Dalfo et al. | 707/201 |
| 2009/0024507 A1* | 1/2009 | Sabarish et al. | 705/35 |

FOREIGN PATENT DOCUMENTS

| | | | |
|---|---|---|---|
| EP | 1770463 A1 | 4/2007 | |
| WO | 03071455 A2 | 8/2003 | |
| WO | WO 2007032994 A2 * | 3/2007 | G05B 15/00 |

* cited by examiner

METHOD OF CONFIGURING MANUFACTURING EXECUTION SYSTEMS

BACKGROUND OF THE INVENTION

Field of the Invention

The present invention relates generally to industrial production systems. More particulary, the invention relates to a method of configuring a manufacturing execution system implemented in industrial production systems.

One exemplary application of different coding schemes is within a production process of an industrial production system. Manufacturing processes are highly automated and may be divided into several hierarchical layers. For example, at the highest level, the enterprise resource planning (ERP) takes place, which may be referred to as a business layer. At lower levels, the hardware implementation and control take place, which may be referred to as various control levels. Industry standard ISA S95 defines an intermediate layer that integrates and connects together business and control layers. That intermediate layer is referred to as manufacturing execution system (MES) that defines an MES process in terms of data and interactions between functions, such as resource management, resource allocation, dispatching, data collection and acquisition, quality assurance management, maintenance management, performance analysis, scheduling, document control, labour management and material and production tracking.

In the area of manufacturing execution systems, an extensive line of products, e.g., the SIMATIC® IT product from Siemens AG, Germany, is available for solving a variety of technical tasks. In this context, a broad range of IT solutions exist to connect the actual hardware close to the technical and/or logistical process to the application layer of the client driving the installation. Manufacturing execution systems have therefore been developed to meet all of the requirements of a service oriented architecture (SOA) to integrate seamless into a totally integrated automation (TIA). For example, SIMATIC® IT is the manufacturing execution system in TIA, and SIMATIC® PCS 7 is a process control system suitable for cooperation with a manufacturing execution system.

US 2005/0159932 represents the various levels of a manufacturing process in form of a pyramid. In that representation, the uppermost level is the ERP level, and the lowermost level of the pyramid is the automation/control level, wherein the MES level is the linking level. Programmable logic controllers (PLCs) in conjunction with visualization and process control systems (PCSs) are typically used on the automation level. Individual drives, actuators and sensors used in the production and/or manufacturing facilities are in direct contact with the systems of the automation level.

US 2005/0159932 explains further that an MES system contains a runtime system (RTS) for providing time-based sequence control of the components involved (sub-components, modules, tasks, operating system processes etc.), and an engineering system (ES) for creating and editing programs which are intended for execution in the runtime system. A connection between the runtime system of the control facility (or of the automation system or the MES system) and a technical process is effected by way of inputs/outputs. The programming of the control facility and with it the specification of the behavior of the runtime system is carried out in the engineering system. The engineering system contains tools for configuring, planning and programming machines and controlling technical processes. The programs created in the engineering system are then transferred to the runtime system RTS of a target system.

The control programs or installation specifications created by the engineering system are executed on a target system, for example, to control a technical process. The target system includes processors, storage facilities and a runtime system. The ES-created control programs are loaded onto the target system's runtime system. The underlying technical process, e.g., for an MES solution, is controlled via inputs and outputs. Actuators are influenced by the runtime system via the inputs and outputs. The technical process reacts by sending sensor data back to the runtime system via the inputs and outputs for further processing in the application.

Elements used for an installation description, or for a manufacturing or assembly solution (installation parts, installation components, machines, valves etc.) are linked in the engineering phase with meta information or physically contain meta information. Meta information may be information about the elements themselves (e.g., Who is using anelement?, With which other elements does it interact?). However, meta information can also comprise knowledge about an application, the business process to be implemented or the entire installation. This type of knowledge is present in the engineering phase (in functional specifications, design specifications or other installation documentation) and simply needs to be incorporated into the elements as meta information. In particular, the markup language XML (Extensible Markup Language) is suitable for describing meta information and linking it with elements.

The ERP system sends data to the MES using XML text, which is text containing information coded with XML syntax. The MES, in turn, communicates with the PLCs of the automation layer via data that is not coded with XML syntax. XML operations are performed by an external application programming interface (API) provided by document object model (DOM) that allows access to XML documents. Each XML operation is processed by the DOM through an out-of-process COM (component object model) call to a DOM's method. Instead, structure coded information is handled internally. Due to the different handling of XML operations and structure coded information exchanging data between is difficult.

BRIEF SUMMARY OF THE INVENTION

There is, therefore, a need for an improved manner of operating a production process, in particular an improved manner of handling information in the MES that communicates with the ERP and the PLC of the automation layer. Accordingly, the various embodiments described herein unify the processing of XML coded information and structure coded information in a graphical environment that supports regular expressions and structures but does not support XML.

One aspect of the various embodiments described herein involves a method of configuring a manufacturing execution system. According to the method, data of a first coding type is received from a first hierarchical layer, and data of a second coding type is received from a second hierarchical layer. The method transforms at least one of the data of the first type and the data of the second type to a complex data structure configured for implementing uniform data processing within the manufacturing execution system.

The idea is to provide a coding convention that suitable for large amounts of complex data and relative small amounts of "simple" data. Often a data provider, such as the ERP layer, sends data coded as XML text to the MES. The MES must process the XML text in order to send "simpler" data to its sub components, and even simpler data to lower software layers, such as batch systems.

While information coded as text requires a lot of memory space binary data requires less memory space, e.g., the integer 100 coded as text "100" takes 3 characters but since XML text is Unicode (each char takes 2 bytes) it requires 6 bytes of memory. However, coded as binary 1100100 the integer requires only 1 byte. Further, processing data coded as text is CPU intensive, e.g., in the operation 100+1, coded as texts "100"+"1", the CPU must first convert text "100" to binary 1100100 and "1" to 1, and then perform one logical operation 1100100 OR 1=1100101. Then, the binary must be converter to text, i.e., 1100101 to "101". Coded as binary, one logical operation 1100100 OR 1=1100101 is required.

The invention uses a new structure, hereinafter referred to as XML-Data (where values are coded as binary), not only to process XML-Text, but also as communication protocol between subcomponents. For example, the ERP layer provides an XML-Text to the MES, the MES translates it into an XML-Data structure and sends specific sub XML-Data structures to its subcomponents. The MES can feed also a batch system with binary data taken directly form the values inside the XML-Data structure. Advantageously, memory/CPU intensive amounts of data are no longer propagated inside the applications so that the system is less complex, operates faster and less expensive.

As discussed below, the invention may be used with the SIMATIC® IT software product, that includes a production modeler. The production modeler (PM) is a framework that provides a development environment dedicated to MES applications. Internally, it is possible to define several equipments, wherein for each equipment behavior designating graphical rules are defined. A rule is a sequence of operations (steps) connected to each other. A user can drag the 'template' of a step from a palette and put it upon the workspace of the rule. A defined palette provides steps that are able to process XML-Data structure and XML-text.

When the user places a step upon the workspace, the production modeler asks for several configuration parameters, such as input arguments, where to put output arguments, and specific attributes. Input arguments can be taken from any previous step and the output arguments can be passed to any subsequent step. There is also a root of the rule that is a special step for propagating input/output arguments. Each step performs a certain operation, and the rule shows the sequence of the operations, and each step has arguments that are the input/outputs of the operation. For example, the user is able to place a step to read an XML-file and convert it to a XML-Data structure, then to place another step to call a method of the material manager (MM) and to configure as input argument the output argument of the previous step.

The novel features and method steps characteristic of the invention are set out in the claims below. The invention itself, however, as well as other features and advantages thereof, are best understood by reference to the detailed description, which follows, when read in conjunction with the accompanying drawings, wherein:

DESCRIPTION OF THE INVENTION

Figure 1:
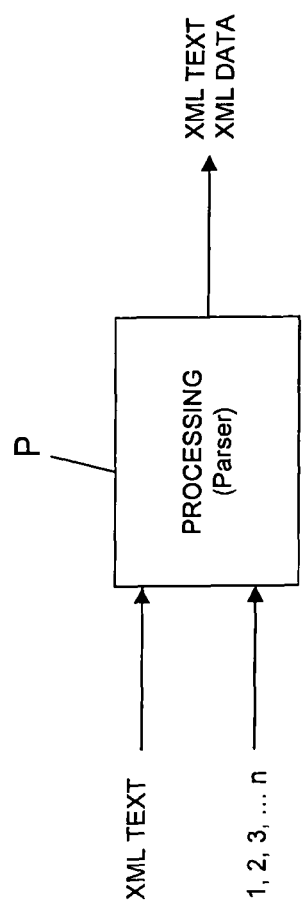
FIG. 1 shows a schematic illustration of one embodiment of a process for mapping high level information and low level information into a uniform data structure.

FIG. 1 shows a schematic illustration of one embodiment of a process for building a new data structure configured to map high level information and low level information for uniform processing in a production execution system for a plant model. The plant model is part of a business logic defined by a software module contained in a MES software and configured to create the plant model. An exemplary MES software is the SIMATIC® IT software product, in which the software module used to create the plant model is referred to as "production modeler" and provided within a graphical software environment.

The SIMATIC® IT MES software product is one example of a MES software in which the invention described herein may be applied. In the SIMATIC® IT MES software product, product specific features or processes such as product order manager (POM) and material manager (MM) are defined. The various embodiments of the invention are described herein with reference to the SIMATIC® IT MES software product. However, other MES software products may have different features. It is contemplated that the general concept of the invention, i.e., unifying the processing of XML coded information and structure coded information in a graphical environment, is applicable to any MES system.

The plant model describes all the elements that cooperate in fulfilling manufacturing targets, such as physical and logical elements. Physical elements are used in the manufacturing cycle, and represent the plant floor, such as reactors, mixers, a packaging line, or more complex ones, such as an assembly line or a continuous casting machine. Logical elements are all software components configured to fulfil a processing/manufacturing cycle, with the objective of managing the necessary information to track and manage the entire production. Logical elements are, for example, a material manager (MM) and a product order manager (POM).

In the illustration of FIG. 1, the high level information originates, for example, from the ERP layer and is in the form of XML text, whereas the low level information originates from the PLC of the automation layer. The low level information is not in an XML format and may include Boolean ("TRUE", "FALSE") or quantity data (1, 2, 3, . . . n), or a combination of these types of data.

The production modeler inside SIMATIC® IT is in one embodiment based on G2, which is an object-oriented development environment for creating real-time applications, e.g., it combines rule-based and procedural reasoning, user interface graphics, database interface capabilities and dynamic simulation. Hence, G2 supports regular expressions and structures, but does not support XML. Further, in G2 a text value contains a series of characters, wherein each must be a member of the Unicode character set. The maximum number of characters in a text value is 1,000,000. In spite of the 1,000,000 limit, G2 takes a lot of time and CPU when processing large texts, e.g., above 64,000 characters.

Data may be fed to the production modeler as XML-text or non-XML data. The process illustrated in FIG. 1 employs a parser P inside the production modeler (SIMATIC® IT) for building a new data structure configured to map high level information (XML-text) and low level information (non-XML data) for uniform processing in a MES. The new data structure according to the invention is hereinafter referred to as XML-DATA. As known in the art of XML programming, a parser is a computer program that reads and analyzes an XML document and presents the information (i.e., elements and attributes) for further processing or manipulation, e.g., by the DOM.

The new data structure, XML-DATA, is handled internally by the production modeler through a set of linear algorithms developed upon regular expressions. The algorithms are accessible to the user of the production modeler through a set of objects, such as XML-text-to-XML-DATA, or XML-DATA-find. Exemplary objects are described below with reference to FIGS. 2 and 3.

To generate the XML-DATA from XML-Text and non-XML data, the parser P is based on regular expressions and operates within a linear loop without calling external procedures or using recursions. The parser P, and hence the production modeler outputs data as XML-DATA or XML-text. An XML-text is a flat text that contains a complex hierarchical data structure coded with XML syntax. The new structure XML-DATA has the same complex hierarchical data structure but is coded as a collection of structures. In XML-DATA, each structure takes the place of an XML-entity, wherein the attributes of that structure are the same as those of the XML-entity; however, the first character of the attribute's name must be an apostrophe (') to avoid a collision with keywords of the development language. There are also two new attributes 'entity_name' and 'entity_content': the value of the 'entity_name' is a text containing the XML-entity name, and the value of the 'entity_content' is a sequence of every nested xml-entity coded as XML-DATA or text. In the embodiment described herein the 'entity_name' is mandatory and the 'entity_content' is optional.

The following examples illustrate the new XML-DATA structure for various applications, e.g., text, integer, float, and Boolean. The examples show various XML structures for these application, and the corresponding XML-DATA structures.

Example 1

Conventional XML Structure for Text and Having a Root Element (ROOT) with an Entity NODE

```
<ROOT>
    <NODE ID="1" TXT_ATT="A1"/>
</ROOT>
Corresponding XML-DATA structure:
structure (
    'ENTITY_NAME': "ROOT",
    'ENTITY_CONTENT': sequence (
        structure (
            'ENTITY_NAME': "NODE",
            'ID: 1,
            'TXT_ATT: "A1")))
```

Example 2

XML Structure for Integers (Whole Numbers)

```
<ROOT>
    <NODE ID="2" INT_ATT="123"/>
</ROOT>
Corresponding XML-DATA structure:
structure (
    'ENTITY_NAME': "ROOT",
    'ENTITY_CONTENT': sequence (
        structure (
            'ENTITY_NAME': "NODE",
            'ID: 2,
            'INT_ATT: 123)))
```

Example 3

XML Structure for Floating Point Numbers

```
<ROOT>
    <NODE ID="3" FLT_ATT="1.23"/>
</ROOT>
Corresponding XML-DATA structure:
structure (
    'ENTITY_NAME': "ROOT",
    'ENTITY_CONTENT': sequence (
        structure (
            'ENTITY_NAME': "NODE",
            'ID: 3,
            'FLT_ATT: 1.23)))
```

Example 4

XML Structure for Boolean Data

```
<ROOT>
    <NODE ID="4" BOOL_ATT="true"/>
</ROOT>
Corresponding XML-DATA structure:
structure (
    'ENTITY_NAME': "ROOT",
    'ENTITY_CONTENT': sequence (
        structure (
            'ENTITY_NAME': "NODE",
            'ID: 4,
            'BOOL_ATT: true)))
```

Example 5

XML Structure for Various Data Types (XML-DATA can Carry Various Data Types while XML Carries Only Text

```
<ROOT>
    <NODE ID="1" TXT_ATT="A1"/>
    <NODE ID="2" INT_ATT="123"/>
    <NODE ID="3" FLT_ATT="1.23"/>
    <NODE ID="4" BOOL_ATT="true"/>
</ROOT>
```

Corresponding XML-DATA Structure:

```
structure (
    'ENTITY_NAME': "ROOT",
    'ENTITY_CONTENT': sequence (
        structure (
            'ENTITY_NAME': "NODE",
            'ID: 1
```

```
        'TXT_ATT: "A1"),
    structure (
        'ENTITY_NAME': "NODE",
        'ID: 2,
        'INT_ATT: 123),
    structure (
        'ENTITY_NAME': "NODE",
        'ID: 3,
        'FLT_ATT: 1.23),
    structure (
        'ENTITY_NAME': "NODE",
        'ID: 4,
        'BOOL_ATT: true)
    )
)
```

Advantageously, the new data structure XML-DATA allows breaking certain limitations of the G2 development environment (e.g., the 1,000,000 character limit), and internal data handling without the overhead of the COM technology. For example, to handle the 1,000,000 character limit a sequence of texts (XML-text) is fed to the parser P instead of one large XML-text. When XML-text is to be built from XML-DATA, a sequence of texts (XML-text) is fed to the parser P.

Hereinafter, one example for building the XML-DATA structure from XML-text is described. Data obtained from the PLC of the automation layer does not require a conversion, all the data is nested inside a container of the XML-DATA structure. Then, all information from the PLC are propagated inside the MES's components.

As to XML text from the ERP layer, the parser P must convert the text to a XML-DATA structure. To create the XML-DATA structure, the parser P is a double stage parser. The implemented algorithm performs a linear scan of the XML text via the double stage parser. In the first stage (i.e., a loop that applies PRE-XML-TOKEN), the algorithm looks for chunks of text enclosed between < and >. Those chunks of text contain information about the hierarchy of the data. According to the hierarchy, the parser P prepares the structure. In the second stage (i.e., a loop that applies XML-TOKEN on a sub string extracted by the first stage), the parser P extracts data from the chunks of text and fills the structure.

A good technique to find patterns inside text is the usage of 'regular expressions'. Inside such a regular expression a search pattern is defined. The following two sets of regular expressions are defined.

First Set of Regular Expressions (PRE-XML-TOKEN)

```
header "\<\?.*\?\>"
comment "\<!--{^\-}*--\>"
doctype "\<!DOCTYPE{^\>}*\>"
whitejunk "\<whitespace>+\<"
junk "<whitespace>*{^\<}*"
chunk "\<{^\>}*\>"
"$(header)|$(comment)|$(doctype)" nop
"$(chunk)" chunk
"$(whitejunk)" whitejunk
"$(junk)" junk
```

Second Set of Regular Expressions XML-TOKEN

```
closure "\</"
start "\<"
mono "*/\>"
stop " *\>"
value1 "@"{^@"}*@""
value2 "'{^'}*'"
w "<whitespace>+"
aname "(<symbol>|:)+"
"$(closure)" closure
"$(start)" start
"$(mono)" mono
"$(stop)" stop
"$(value1)|$(value2)" value
"$(w)" w
"$(aname)" aname
```

Inside the XML text syntax there is the constraint that everything is enclosed inside the content of a father and that values are carried as attribute's values or inside a content. For example:

```
<ROOT>
    <NODEA ID="1"/>
    <NODEB ID="2">
        text1
        <NODEC ID="3"/>
    </NODEB>
</ROOT>
```

In one embodiment, there are two kinds of entities:
without content like <NODEA ID="1"/>, where the closure /> is enclosed, and
with content like <NODEB ID="2">, where the closure is </NODEB>.

The values are carried as attribute like ID or inside the content like text1

The parser exploits any constraints. The idea is to read information from XML text and put it at the beginning of a list. When an entity is available, the parser P puts a new structure with the 'entity_name' at the beginning of the list. When a closure is detected, the information at the beginning of the list is collapsed in the first structure.

For example:
1. The parser builds a dynamic list L
2. The first stage of parsing on the XML text gets "<ROOT>"
3. The second stage identifies an entity with a content and puts a structure in the list L:
   L: Structure('entity_name':"ROOT")
4. The first stage of parsing now gets "<NODEA ID="1"/>"
5. The second stage identifies an entity NODEA without a content and puts a structure in the list L.
   L:

```
Structure('entity_name':"NODEA")
Structure('entity_name':"ROOT")
```

6. The second stage identifies an attribute ID and the value 1, updates the first structure in the list L.
   L:

```
Structure('entity_name':"NODEA",'ID:1)
Structure('entity_name':"ROOT")
```

7. The first stage of parsing gets "<NODEB ID="2">"
8. The second stage identifies an entity NODEB with a content and puts a structure in the list L.

L:

```
Structure('entity_name':"NODEB")
Structure('entity_name':"NODEA",'ID:1)
Structure('entity_name':"ROOT")
```

9. The second stage identifies an attribute ID and the value 2, updates the first structure in the list L.

L:

```
Structure('entity_name':"NODEB",'ID:2)
Structure('entity_name':"NODEA",'ID:1)
Structure('entity_name':"ROOT")
```

10. The first stage of parsing now gets "text1" and puts it in the list L

L:

```
"text1"
Structure('entity_name':"NODEB",'ID:2)
Structure('entity_name':"NODEA",'ID:1)
Structure('entity_name':"ROOT")
```

11. The first stage of parsing now gets "<NODEC ID="3"/>"

12. The second stage identifies an entity NODEC without a content and puts a structure in the list L.

L:

```
Structure('entity_name':"NODEC")
"text1"
Structure('entity_name':"NODEB",'ID:2)
Structure('entity_name':"NODEA",'ID:1)
Structure('entity_name':"ROOT")
```

13. The second stage identifies an attribute ID and the value 3, updates the first structure in the list L.

L:

```
Structure('entity_name':"NODEC",'ID:3)
"text1"
Structure('entity_name':"NODEB",'ID:2)
Structure('entity_name':"NODEA",'ID:1)
Structure('entity_name':"ROOT")
```

14. The first stage of parsing now gets "</NODEB>"

15. The second stage identifies the closure of NODEB of every item in the list before NODEB is collapsed in the 'entity_content' of NODEB.

L:

```
Structure('entity_name':"NODEB",'ID:2,
    'entity_content':sequence("text1",
        Structure('entity_name':"NODEC",'ID:3)))
Structure('entity_name':"NODEA",'ID:1)
Structure('entity_name':"ROOT")
```

16. The first stage of parsing now gets "</ROOT>" of every item in the list before ROOT is collapsed in the 'entity_content' of ROOT.

L:

```
Structure('entity_name':"ROOT",
    'entity_content':sequence(
        Structure('entity_name':"NODEA",'ID:1),
        Structure('entity_name':"NODEB",'ID:2,
            'entity_content':sequence("text1",
                ('entity_name':"NODEC",'ID:3)))))
```

17. If there is no more text, the list L contains only one element that is the XML-DATA structure.

The following describes how to build XML-text from an XML-DATA structure. Here, the XML-DATA structure is placed inside a list L, and a text XML="<?xml version=@"1.0@" ?>" is prepared. Then, via a loop, a first element ELEM is obtained from the list L.

If the element ELEM is not a structure, the algorithm appends ELEM to XML. For example:
ELEM="text1"=>XML="<ROOT><NODEA ID="1"/><NODEB ID="2">"+"text1"

If the element ELEM is a structure, the algorithm appends to XML the entity_name and all the attributes. For example:

```
ELEM=Structure('entity_name':"NODEC",'ID:3)
=>
XML="<ROOT><NODEA ID="1"/><NODEB ID="2">text1" +
"<NODEC ID="3""
```

If the structure ELEM does not have a content, the algorithm concatenates "/>" to XML. For example:

```
ELEM=Structure('entity_name':"NODEC",'ID:3)
=>
XML="<ROOT><NODEA ID="1"/><NODEB ID="2">text1" +
"<NODEC ID="3"/>"
```

If the structure ELEM has content, the algorithm puts a close marker at the beginning of the list L and then each item in the content of ELEM at the beginning of the list L. For example:

```
ELEM= Structure('entity_name':"NODEB",'ID:2,
    'entity_content':sequence(
        "text1",
        Structure('entity_name':"NODEC",'ID:3)))
L=
Text1
Structure('entity_name':"NODEC",'ID:3)
</NODEC>
```

At the next run of the loop, the first element of the list L, which is text1, is processed, and so on, until the list L is empty.

Figure 2:
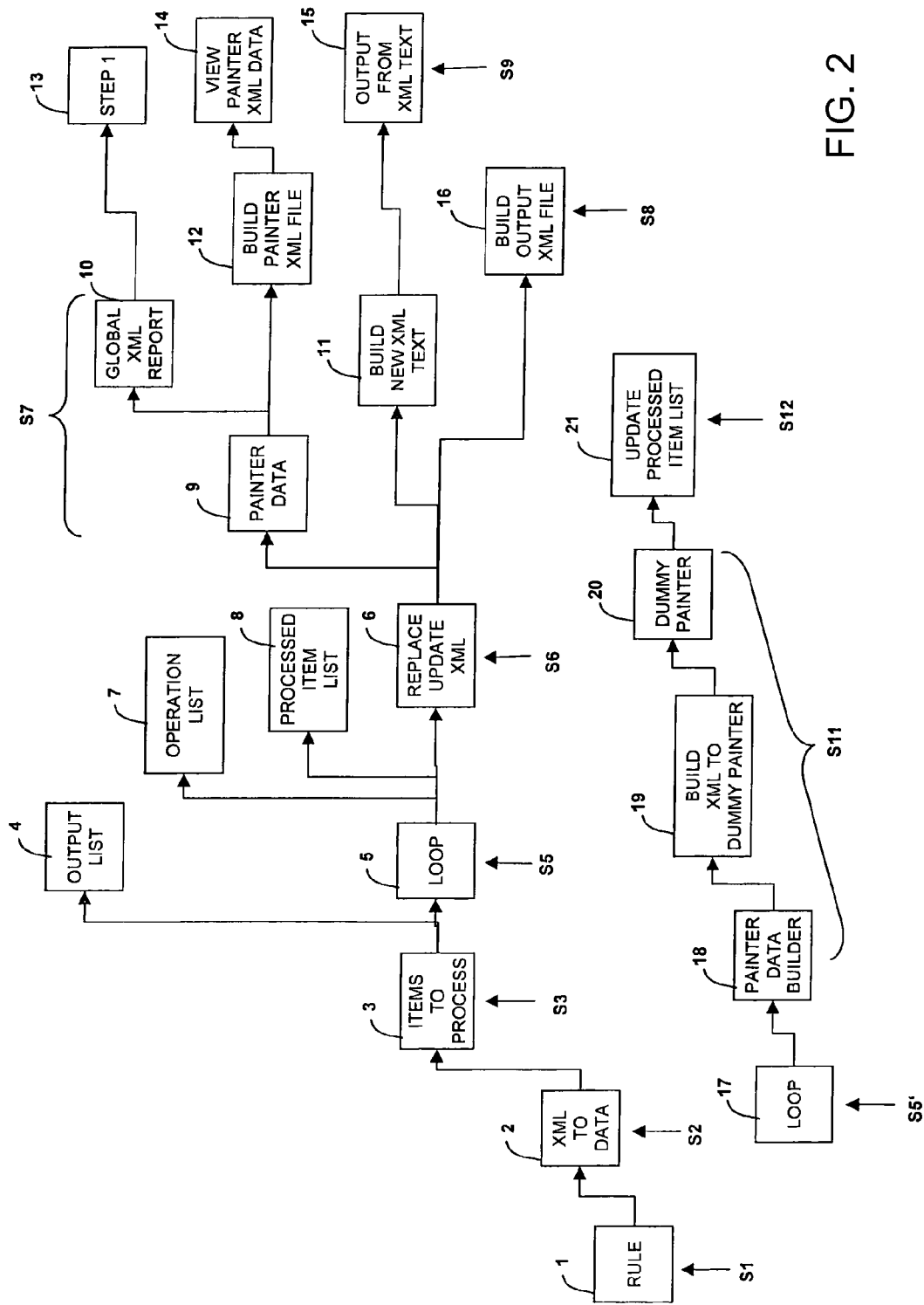
FIG. 2 is a schematic illustration of one embodiment of a rule for mapping high level information and low level information into a uniform data structure.

As mentioned above, the algorithms used in the production modeler are accessible to the user of the production modeler through a set of objects (XML support tools), as described hereinafter. The objects are used to create a graphical rule for mapping high level information and low level information into a uniform data structure. The rule can be shown via a GUI, as illustrated in FIG. 2, and described with reference to FIG. 3, which shows a flow chart illustrating one embodiment of the rule.

XML-TEXT(S)-TO-XML-DATA Object

This object (numeral 2 in FIG. 2) parses a text (1,000,000 characters), or a sequence of texts to a structure. Input arguments are XML-text, and return arguments are XML-DATA.

Figure 3:
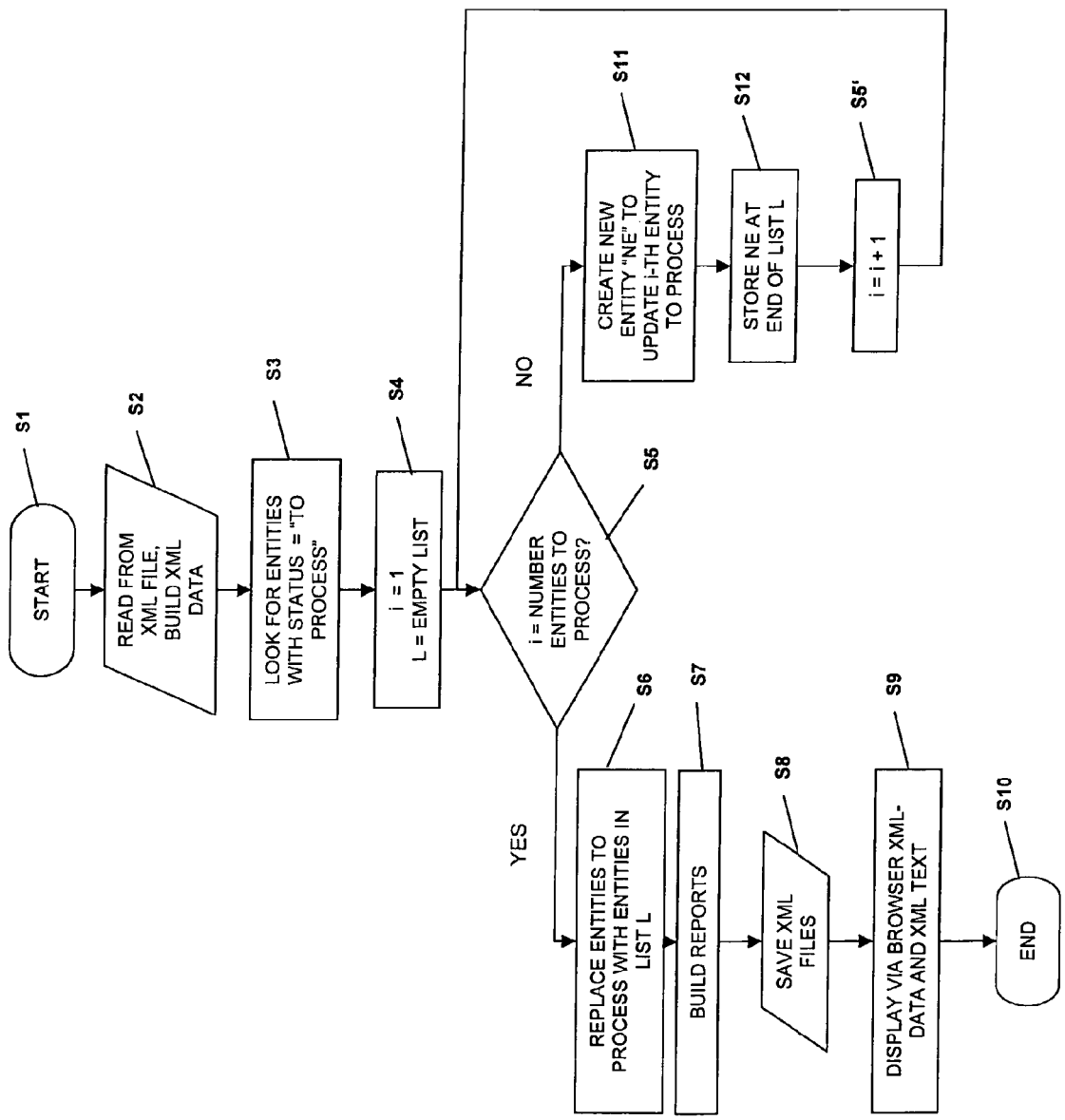
FIG. 3 is a flow chart illustrating the rule of FIG. 2.

XML-DATA-TO-XML-TEXT Object
   Input-Arguments: XML-DATA (type item-or-value)
   Return-Arguments: XML-TEXT (type text)
XML-TEXTS-TO-XML-DATA Object
   Input-Arguments: XML-TEXTS (type sequence (text))
   Return-Arguments: XML-DATA (type item-or-value)
XML-DATA-TO-XML-TEXTS Object
   Input-Arguments: XML-DATA (type item-or-value)
   Return-Arguments: XML-TEXT (type sequence (text))
XML-FILE-TO-XML-DATA Object
   Input-Arguments: XML-FILE (type text)
   Return-Arguments: XML-DATA (type item-or-value)
XML-DATA-TO-XML-FILE Object
   This object builds a text (less then 1000000 characters), or a sequence of text from a structure. An object XML-DATA-2-XML-FILE saves a file from the structure. Input-Arguments are XML-FILE (type text), and XML-DATA (type item-or-value).
XML-DATA-FIND Object
   This object looks for those entities that match the filter specified in the input arguments and returns a sequence of structures. The engine inside the production modeler is configured to perform search operations on the XML-DATA upon defining search criteria (filter), such as an entity with a given name, an entity having a certain text as content, an entity having an attribute with a given name, or an entity with an attribute's value assigned to a given text. The output of the engine is a collection (sequence) of XML-DATA that matches the search criteria. The search may be by name, by textual content, by the presence of an attribute, or by the value of an attribute.
   Input-Arguments: XML-DATA (type item-or-value)
      ENTITY-NAME (type text)
      ENTITY-CONTENT (type text)
      ATTRIBUTE-NAME (type symbol)
      ATTRIBUTE-VALUE (type text)
      LOGICAL-OPERATOR (type symbol)
   Return-Arguments: XML-DATA-RESULTS (type sequence (structure))
XML-DATA-FIND-FOR-REPLACE Object
   This object works like the XML-DATA FIND object but it also marks the places where the entities are found. In addition to specifying the search criteria, replacement data needs to be specified to allow the engine to replace the found data with the replacement data. For that feature, the engine output a sequence of XML-DATA that matches the search criteria, or a data structure XML-COMP that logically contains everything but the found entities. The XML-COMP carries the XML-DATA within the replacement data an internal data structure. The engine is able to substitute every replaceable entity inside the XML-COMP with a given sequence of XML-DATA and build a new XML-DATA. The output argument XML-Comp is the "logical complement" and carries the XML-Data with the markers.
   Input-Arguments: XML-DATA (type item-or-value)
      ENTITY-NAME (type text)
      ENTITY-CONTENT (type text)
      ATTRIBUTE-NAME (type symbol)
      ATTRIBUTE-VALUE (type text)
      LOGICAL-OPERATOR (type symbol)
      REPLACER (type symbol)
   Return-Arguments: XML-DATA-RESULTS (type sequence (structure))
      XML-COMP (type item-or-value)
XML-DATA-REPLACER Object
   Once the previous step finds the places, this object places the new information. This object takes the XML-Comp structure, a sequence of entities coded as XML-Data and a replacer (the XML-Comp may contain many different markers), then updates every entity marked with the replacer using the elements of the XML-Data-Sequence.
   Input-Arguments: XML-COMP (type item-or-value)
      XML-DATA-SEQUENCE (type sequence (structure))
      REPLACER (type symbol)
   Return-Arguments: XML-COMP-RESULT (type item-or-value)
XML-DATA-CONCATENATE Object
   This object is configured to merge many entities under a "father", the root input argument can be a symbol or an Xml-Data structure (take care of the type), 'ENT-N' can be a structure or a sequence of structures.
   Input-Arguments: ROOT (types symbol or item-or-value)
      ENT-(n) (types item-or-value or sequence (structure))
   Return-Arguments: XML-DATA (type item-or-value)
XML-DATA-ENTITY-CREATE Object
   Input-Arguments: ENTITY-NAME (type symbol)
      [ATTRIBUTE-NAME] (type text)
   Return-Arguments: XML-DATA (type item-or-value)
XML-VIEWER Object
   Input-Arguments: RULE-NAME (type symbol)
      XML (types text or sequence(text) or item-or-value)
XML-DATA-LOCAL-LIST Object
   This object is a specialized list configured to store a collection of XML-DATA (as structure), and to show the values as XML-text to improve readability. For example, it is possible to select a line from the text and edit it. The edited text a new structure is determined and stored.
   In addition, the engine is configured to build a new XML-DATA structure by merging a collection of XML-DATA structures inside a given root entity, wherein the root entity is provided as XML-DATA structure. The root can be an existing XML-Data structure or a new one that can be created inside the step providing the name and the couples (attribute, value).
   Referring to FIG. 3, the process starts at a step S1 (see box 1 in FIG. 2). Proceeding to a step S2 (see box 2 in FIG. 2), the process includes reading via the parser P from an XML file. The parser P analyzes the XML file and builds the new XML-DATA structure.
   Proceeding to a step S3 (see box 3 in FIG. 2), the process looks for and determines the number of entities to process, i.e., for entities with a status "to process". After step S3, the process knows how many entities to process exist.
   Proceeding to a step S4, the process sets a loop variable i to 1. A list L is empty at this initial stage of the process.
   Proceeding to a step S5 (see box 5 in FIG. 2), the process determines whether the variable i equals the number of entities to process. That number of entities is determined by an expression counting the number of items found in step S3. If the variable i equals the number of entities to process, the process proceeds along the YES branch to a step S6.
   In step S6 (see box 6 in FIG. 2), the process replaces the entities to process with the entities in the list L.
   Proceeding to a step S7, the process creates a variety of reports (see boxes 9, 10, 11 in FIG. 2).
   Proceeding to a step S8 (see boxes 12 and 16 in FIG. 2), the process saves a variety of XML files based on the reports created in step S7.
   Proceeding to a step S9 (see boxes 13, 14 and 15 in FIG. 2), the process displays via a browser XML-DATA and XML-text, and ends at a step S10.
   In step S5, if the loop variable i does not equal the number of entities to process, the process proceeds along the NO branch to a step S11. In step S11 (see boxes 18, 19 and 20 in FIG. 2), the process creates a new entity NE and updates the i-th entity to process with the new entity NE.

Proceeding to a step S12 (see box 21 in FIG. 2), the process stores the new entity NE at the end of the list L.

Proceeding to a step S5' (see box 17 in FIG. 2), the process increments the loop variable i by 1 and returns to step S5.

It is apparent that there has been described a system and method that fully satisfy the objects, means, and advantages set forth hereinbefore. Advantageously, the new structure XML-DATA facilitates the communication between the MES and the ERP and the automation layer, and the MES internal handling of data.

The invention claimed is:

1. A method of configuring a manufacturing execution system including a production modeler, the method which comprises the steps of:
receiving data of a first coding type from a first hierarchical layer, wherein the data of the first coding type originates as XML text from an enterprise resource planning layer;
receiving data of a second coding type, which is different from the first coding type, from a second hierarchical layer, wherein the data of the second coding type originates as non-XML information from a control system of an automation layer;
transforming at least one of the data of the first coding type and the data of the second coding type into a new data structure configured for implementing uniform data processing within the manufacturing execution system;
handling the new data structure internally by a production modeler, the production modeler employing a parser for building the new data structure using a set of linear algorithms that are accessible to a user of the production modeler through a set of objects;
wherein the XML text from the enterprise resource planning layer is converted by the parser to the new data structure by an application of a double stage parser, wherein the XML text is scanned in a first stage by linear algorithms looking for chunks of text enclosed between "<" and ">", wherein the chunks of text include information about a hierarchy of the data, wherein the double stage parser prepares the structure according the hierarchy of the data, and wherein in a second stage the double stage parser extracts data from the chunks of text and fills the structure accordingly; and
wherein the non-XML information from the control system of the automation layer is not converted, but nested inside a container of the new data structure thereby allowing propagation of all non-XML information inside the manufacturing execution system.

2. The method according to claim 1, wherein the step of sending the complex data structure from the processor to at least one subcomponent of the manufacturing execution system includes sending the complex data structure to an actuator to influence the actuator.

3. The method according to claim 1, wherein: the set of objects is XML-text-to-XML data or XML-data-find.

* * * * *